(12) United States Patent
Chen

(10) Patent No.: US 8,950,761 B2
(45) Date of Patent: Feb. 10, 2015

(54) COLLAPSIBLE CHILD CARRIER APPARATUS

(75) Inventor: Xuhui Chen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 484 days.

(21) Appl. No.: 12/966,385

(22) Filed: Dec. 13, 2010

(65) Prior Publication Data

US 2011/0148076 A1 Jun. 23, 2011

(30) Foreign Application Priority Data

Dec. 18, 2009 (CN) .......................... 2009 1 0258822

(51) Int. Cl.
- *B62B 7/10* (2006.01)
- *B62B 7/06* (2006.01)
- *B62B 9/20* (2006.01)
- *B62B 7/08* (2006.01)

(52) U.S. Cl.
CPC . *B62B 9/203* (2013.01); *B62B 7/08* (2013.01); *B62B 2205/22* (2013.01)
USPC ...................... 280/47.36; 280/47.38; 280/647; 280/47.4

(58) Field of Classification Search
USPC ............. 280/38, 42, 641, 643, 644, 646, 647, 280/649, 650, 655, 47.34, 47.38–47.4, 280/47.25
See application file for complete search history.

(56) References Cited

U.S. PATENT DOCUMENTS

| | | | | |
|---|---|---|---|---|
| 4,191,397 A | * | 3/1980 | Kassai | ........................... 280/647 |
| 4,216,974 A | * | 8/1980 | Kassai | ............................. 280/42 |
| 4,832,361 A | | 5/1989 | Nakao et al. | |
| 5,257,799 A | * | 11/1993 | Cone et al. | ..................... 280/642 |
| 5,513,864 A | * | 5/1996 | Huang | ........................ 280/47.36 |
| 5,845,924 A | * | 12/1998 | Huang | ........................... 280/642 |
| 6,116,624 A | | 9/2000 | Hu | |
| 6,220,621 B1 | | 4/2001 | Newton | |
| 6,478,328 B1 | * | 11/2002 | Yeh et al. | ....................... 280/650 |
| 6,508,605 B1 | | 1/2003 | Cheng | |
| 6,530,591 B2 | | 3/2003 | Huang | |
| 6,824,161 B2 | | 11/2004 | Iwata | |
| 6,830,254 B2 | | 12/2004 | Lan | |
| 6,851,700 B2 | | 2/2005 | Yoshie et al. | |

(Continued)

FOREIGN PATENT DOCUMENTS

| | | |
|---|---|---|
| CN | 200420083534 | 9/2004 |
| CN | 200520003600 X | 2/2005 |

(Continued)

*Primary Examiner* — J. Allen Shriver, II
*Assistant Examiner* — Travis Coolman
(74) *Attorney, Agent, or Firm* — David I. Roche; Baker & McKenzie LLP

(57) ABSTRACT

A collapsible infant carrier apparatus comprises a support frame including front and rear leg frames and a handle, and a linkage frame pivotally connected with the front leg frame and the handle. A first latch mechanism is connected between the handle and the linkage frame, wherein the first latch mechanism is operable to lock the handle in position relative to the linkage frame. A second latch mechanism is connected between the linkage frame and the front leg frame and having a locked state and an unlocked state, wherein the second latch mechanism when in the locked state locks the linkage frame with the front leg frame, and the second latch mechanism when in the unlocked state enables rotation of the linkage frame relative to the front leg frame. The infant carrier apparatus can be collapsed by rotating the linkage frame.

16 Claims, 11 Drawing Sheets

(56) References Cited

U.S. PATENT DOCUMENTS

| | | | |
|---|---|---|---|
| 6,893,031 B2 * | 5/2005 | Suzuki | 280/47.36 |
| 6,951,342 B2 | 10/2005 | Lan | |
| 7,021,650 B2 | 4/2006 | Chen | |
| 7,273,225 B2 | 9/2007 | Yeh | |
| 7,401,803 B1 | 7/2008 | Lai | |
| 7,513,512 B2 | 4/2009 | Yoshie et al. | |
| 7,798,500 B2 * | 9/2010 | Den Boer | 280/47.34 |
| 8,210,563 B2 * | 7/2012 | Dotsey et al. | 280/647 |
| 8,262,124 B2 * | 9/2012 | Longenecker et al. | 280/650 |
| 8,360,514 B2 * | 1/2013 | Chen et al. | 297/16.1 |
| 8,382,127 B2 * | 2/2013 | Longenecker et al. | 280/47.4 |
| 2003/0080536 A1 * | 5/2003 | Hartenstine et al. | 280/642 |
| 2005/0242549 A1 * | 11/2005 | Longenecker et al. | 280/642 |
| 2007/0096438 A1 | 5/2007 | Valdez et al. | |
| 2008/0088116 A1 | 4/2008 | Den Boer | |
| 2010/0156060 A1 * | 6/2010 | Dotsey et al. | 280/47.371 |
| 2010/0259021 A1 * | 10/2010 | Ahnert et al. | 280/47.4 |

FOREIGN PATENT DOCUMENTS

| | | |
|---|---|---|
| CN | 200520055399 | 3/2005 |
| CN | 200620165613 | 12/2006 |
| CN | 29028364 Y | 5/2007 |
| CN | 1919796 C | 6/2007 |
| CN | 201023526 Y | 2/2008 |
| CN | 201077473 Y | 6/2008 |
| CN | 201086733 Y | 7/2008 |
| CN | 201154720 Y | 11/2008 |
| CN | 201214439 Y | 4/2009 |
| CN | 101553391 A | 10/2009 |
| EP | 1693277 A2 | 8/2006 |
| EP | 1970284 A2 | 9/2008 |
| GB | 2448059 A | 1/2008 |
| TW | 275137 | 4/2005 |

* cited by examiner

COLLAPSIBLE CHILD CARRIER APPARATUS

CROSS-REFERENCE TO RELATED APPLICATION

This application claims priority to China patent application no. 200910258822.9 filed on Dec. 18, 2009.

BACKGROUND

1. Field of the Invention

The present invention relates to an infant carrier apparatus, and more particularly to a collapsible infant carrier apparatus.

2. Description of the Related Art

A stroller apparatus typically comprises a support frame provided with wheels, a seat assembly and a handle. After a child is placed in the seat, the parent can use the handle to push the stroller in movement. In traditional strollers, the seat assembly is usually oriented toward the front of the stroller in its direction of displacement. Because the child does not face the parent when seated in the stroller, no interaction is permitted between the child and the parent. To remedy this deficiency, some current approaches propose a stroller structure in which the orientation of the handle can be adjusted back and forth, whereby the child can be seated facing the parent. However, the hinges used for pivoting the handle are usually complex in construction. Moreover, the collapse of the stroller also requires the placement of multiple hinges, which increases the complexity of the stroller structure.

Therefore, there is a need for a collapsible infant carrier apparatus that can be fabricated in a cost-effective manner, easy to operate and address at least the foregoing issues.

SUMMARY

The present application describes a collapsible infant carrier apparatus, such as a stroller apparatus. In one embodiment, the collapsible infant carrier apparatus comprises a support frame including front and rear leg frames and a handle, and a linkage frame pivotally connected with the front leg frame and the handle. A first latch mechanism is connected between the handle and the linkage frame, wherein the first latch mechanism is operable to lock the handle in position relative to the linkage frame. A second latch mechanism is connected between the linkage frame and the front leg frame and having a locked state and an unlocked state, wherein the second latch mechanism when in the locked state locks the linkage frame with the front leg frame, and the second latch mechanism when in the unlocked state enables rotation of the linkage frame relative to the front leg frame.

At least one advantage of the structures described herein is the ability to use a single hand for modifying the orientation of the handle and collapsing the infant carrier apparatus by rotating the linkage frame. Accordingly, the infant carrier apparatus can be operated in a more convenient manner.

DETAILED DESCRIPTION OF THE EMBODIMENTS

Figure 1:
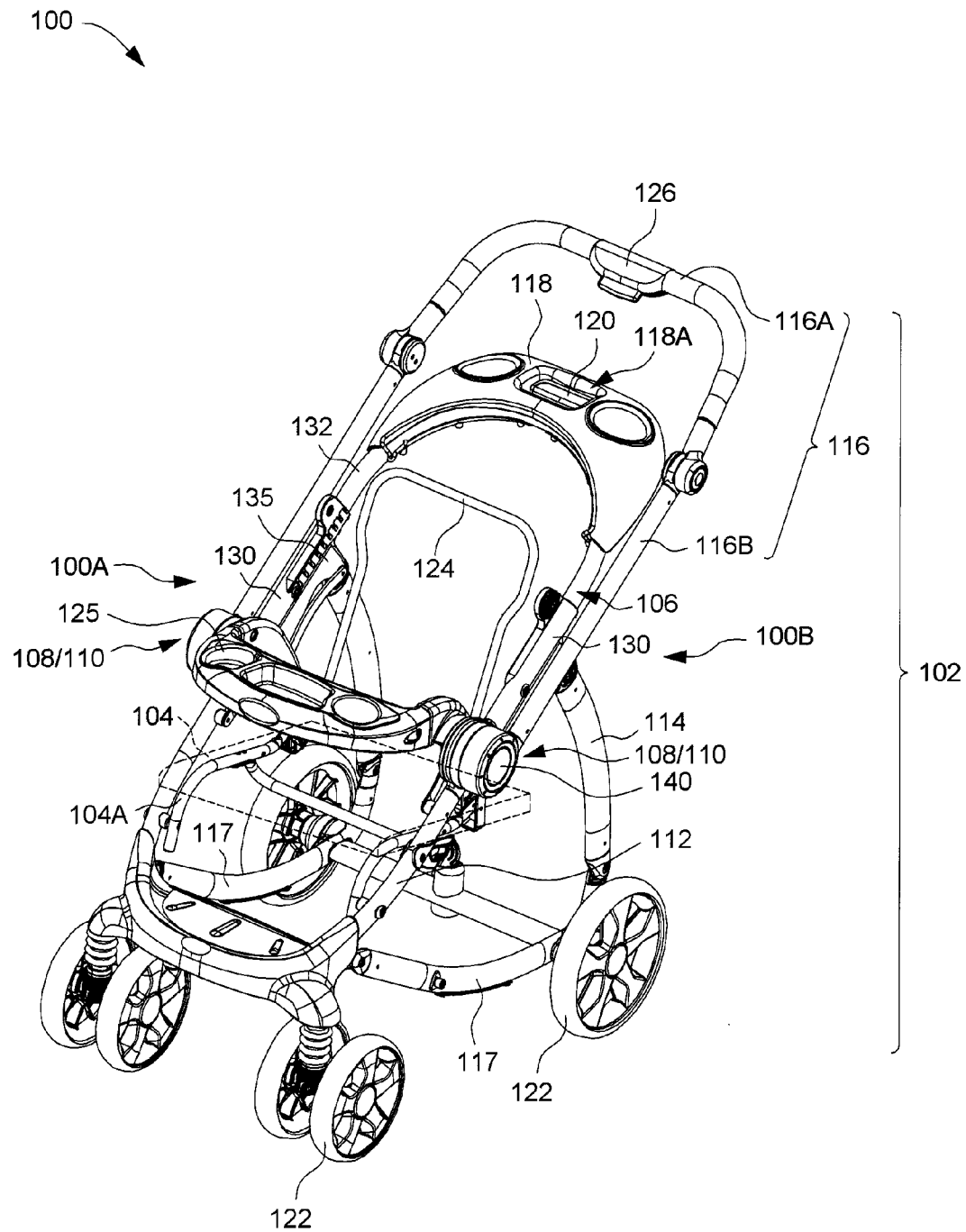
FIG. 1 is a schematic view illustrating one embodiment of a collapsible infant carrier apparatus.

FIG. 1 is a schematic view illustrating a stroller embodiment of a collapsible infant carrier apparatus 100. The infant carrier apparatus 100 comprises a support frame 102, a seat assembly 104 and a linkage frame 106. The support frame 102 can include a front leg frame 112, a rear leg frame 114 and a handle 116. A plurality of wheels 122 may also be connected with bottom ends of the front and rear leg frames 112 and 114, such that the infant carrier apparatus 100 can move toward a first side 100A, or an opposite second side 100B.

Lower ends of the front leg frame 112 may be connected with lower ends of the rear leg frame 114 via left and right longitudinal link bars 117. More specifically, the longitudinal link bars 117 may have first ends pivotally connected with the lower ends of the front leg frame 112, and second ends pivotally connected with the lower ends of the rear leg frame 114. The connection of the longitudinal link bars 117 can facilitate folding and/or unfolding of the infant carrier apparatus 100 as driving movements can be transmitted between the front leg frame 112 and the rear leg frame 114.

The seat assembly 104 is supported between the front leg frame 112 and the rear leg frame 114. According to one embodiment, the seat assembly 104 can include a seat frame 104A, and a cushion arranged on the seat frame 104A. However, the seat assembly is not limited to the aforementioned construction, and may also be formed from a seat board, or the assembly of a seat frame with a fabric element. In addition, the seat assembly 104 can also comprise a U-shaped backrest support 124 and a backrest adjustment (not shown). The backrest support 124 may be provided with a cushion for comfortable back resting, and a user can adjust the inclination of the backrest support 124 via operation of the backrest adjustment. A tray 125 can be provided for disposing objects (e.g., drinking containers, toys, etc.) accessible to a child seated facing the side 100A of the infant carrier apparatus 100.

The linkage frame 106 has a generally U-shape that extends substantially above the seat assembly 104. In one embodiment, the linkage frame 106 can be constructed from a generally U-shaped tubular structure 132 having left and right side segments generally parallel to each other, and a transverse segment connected between the two side segments and provided with a support tray 118. In the illustrated embodiment, the linkage frame 106 is also pivotally connected with the front leg frame 112 and the handle 116. First latch mechanisms 108 can be connected between the linkage frame 106 and the handle 116, whereas second latch mechanisms 110 can be connected between the linkage frame 106 and the front leg frame 112. A release actuator 120 may also be assembled with the support tray 118 for actuating the second latch mechanisms 110. Being embedded in the hinge structures that respectively couple the linkage frame 106 with the front leg frame 112 and the handle 116, the first and second latch mechanisms 108 and 110 are more clearly shown in FIG. 4. Examples of construction for the first and second latch mechanisms 108 and 110 and the release actuator 120 are described in details hereafter.

Referring again to FIG. 1, the handle 116 can be formed from a single or multiple tubular segments assembled with one another. The handle 116 can have a generally U-shape, including a transverse portion 116A, and left and right side segments 116B generally parallel to each other. Upper ends of the side segments 116B are respectively joined with two opposite ends of the transverse portion 116A. The first latch mechanisms 108 are respectively assembled between the linkage frame 106 and the lower end portion of each of the side segments 116B, and are also connected with a release actuator 126 provided on the transverse portion 116A of the handle 116. The release actuator 126 can be operated by a user for unlocking the first latch mechanisms 108, such that the handle 116 can be pivotally adjusted relative to the linkage frame 106. Once the handle 116 has reached the desired position, the first latch mechanisms 108 can lock the handle 116 in position relative to the linkage frame 106.

Figure 2:
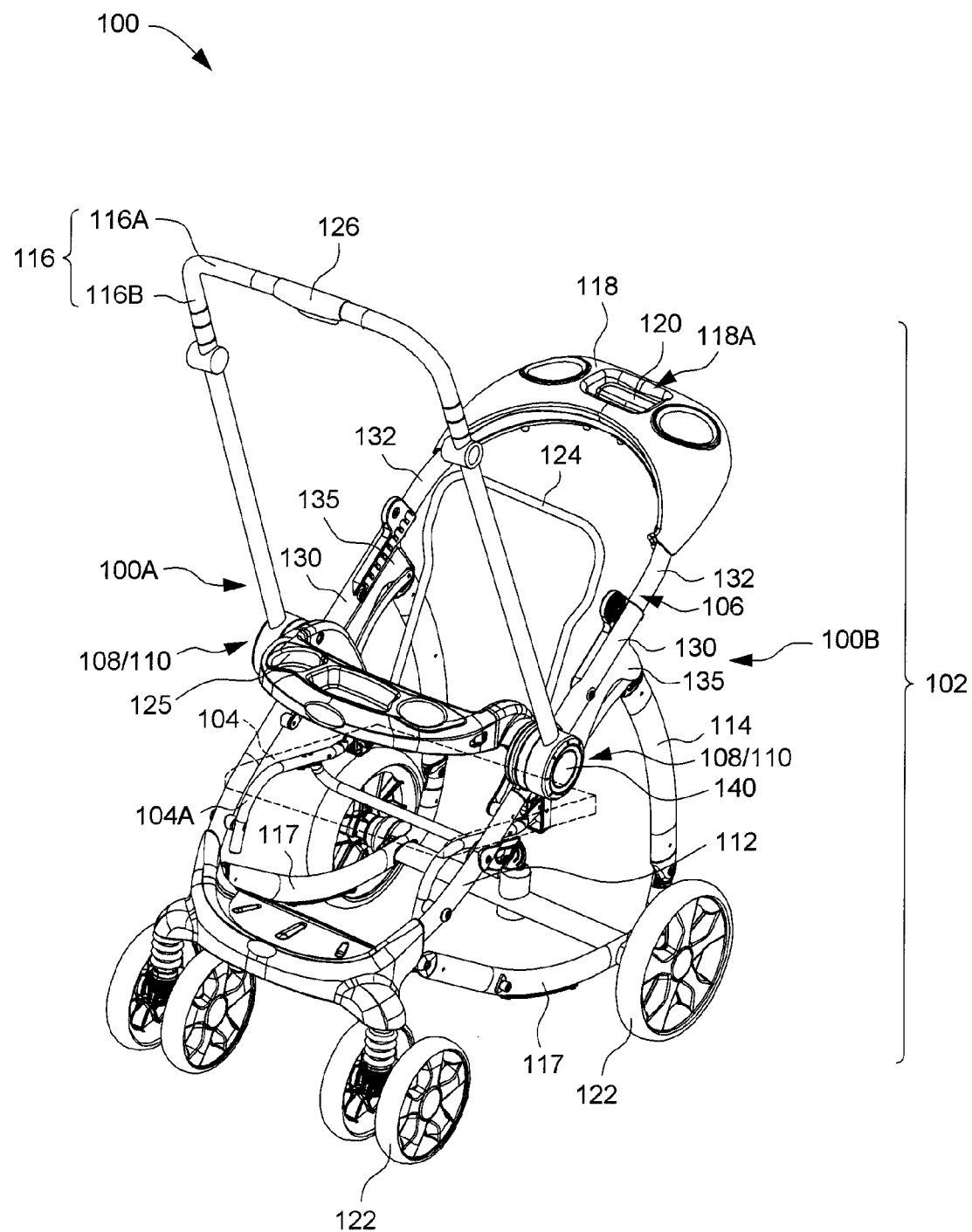
FIG. 2 is a schematic view illustrating an adjustment in orientation of a handle in the infant carrier apparatus shown in FIG. 1.

FIG. 2 is a schematic view illustrating an adjustment in orientation of the handle 116 in the infant carrier apparatus 100. The handle 116 can be adjusted relative to the linkage frame 106 to either of a first position inclined toward the first side 100A (as shown in FIG. 2) and a second position inclined toward the second side 100B of the infant carrier apparatus 100 (as shown in FIG. 1). When the infant carrier apparatus 100 is deployed and the handle 116 is adjusted to a position oriented toward the second side 100B (as shown in FIG. 1), the handle 116 and the linkage frame 106 lie proximate to each other and extend generally in a same direction. In contrast, when the handle is adjusted to a position oriented toward the first side 100A (as shown in FIG. 2), the handle 116 and the linkage frame 106 have opposite orientation. Accordingly, an adult can adjust the position of the handle 116 so that the child placed on the infant carrier apparatus 100 can face either toward the direction of displacement or the adult pushing the infant carrier apparatus 100.

Referring again to FIGS. 1 and 2, each of the second latch mechanisms 110 (better shown in FIG. 4) can have a locked state and an unlocked state. When the second latch mechanisms 110 are in the locked state, the linkage frame 106 and the front leg frame 112 are locked with each other, but an adult can still adjust the position of the handle 116 by operating the release actuator 126. When the second latch mechanisms 110 are in the unlocked state, the linkage frame 106 can be driven in rotation relative to the front leg frame 112, the movement of the linkage frame 106 also driving rotation of the handle 116 relative to the front leg frame 112 for collapsing or deploying the infant carrier apparatus 100.

Figure 3:
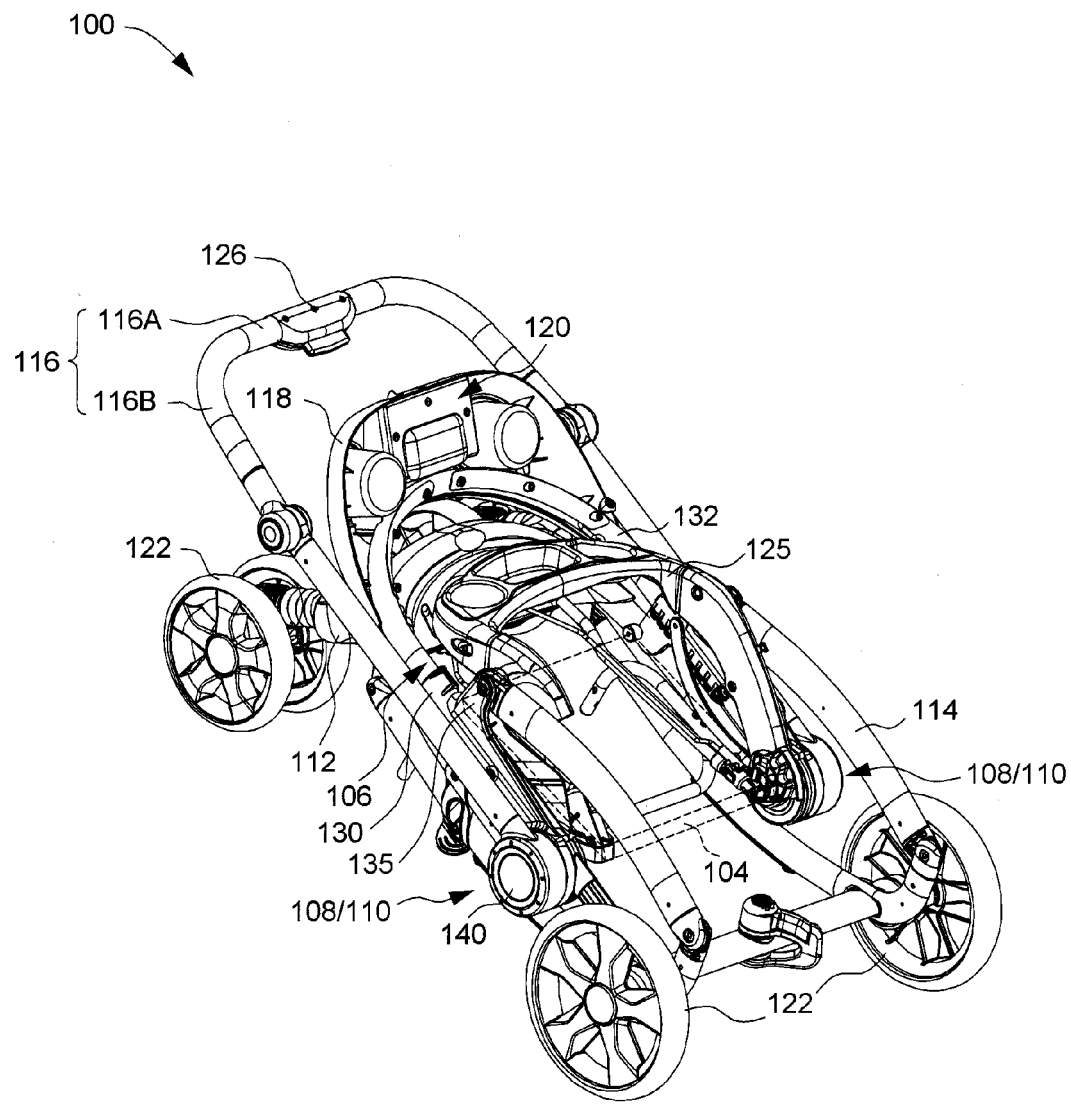
FIG. 3 is a schematic view illustrating the infant carrier apparatus of FIG. 1 in a collapsed state.

FIG. 3 is a schematic view illustrating the infant carrier apparatus 100 in a collapsed state. Once the infant carrier apparatus 100 is fully collapsed, the linkage frame 106, the handle 116 and the front leg frame 112 are folded into a configuration where they are generally parallel to one another. In one embodiment, one first latch mechanism 108 and one second latch mechanism 110 can be respectively provided on both of the left and right sides of the infant carrier apparatus 100. However, in alternate embodiments, the first and second latch mechanism 108 and 110 can be provided at only one side, the other side of the infant carrier apparatus 100 being pivotally connected without locking mechanisms.

Figure 4:
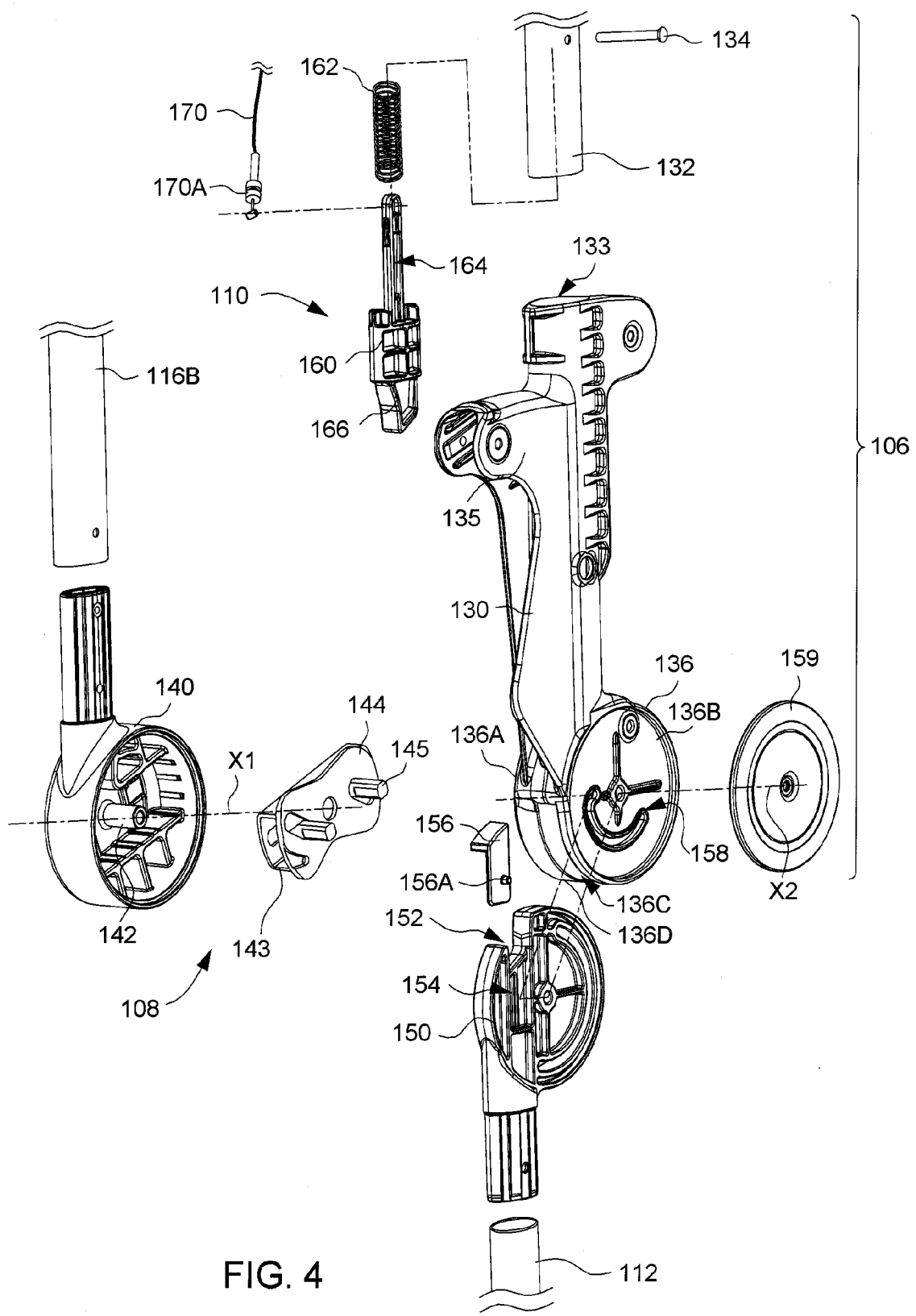
FIG. 4 is an exploded view illustrating the assembly of a linkage frame with a front leg frame and a handle.

In conjunction with FIGS. 1 and 2, FIG. 4 is an exploded view illustrating the assembly of the linkage frame 106 with the front leg frame 112 and the handle 116. As described previously, the linkage frame 106 can have a generally U-shaped tubular structure 132 having left and right side segments generally parallel to each other, and a transverse segment connected between the two side segments. For coupling the linkage frame 106 with the front leg frame 112 and the handle 116, a coupling sleeve 130 can be provided at the end portion of each of the two side segments of the tubular structure 132 (only one is shown in FIG. 4 for clarity).

The coupling sleeve 130 can have a hole 133 through which is inserted the side segment of the tubular structure 132. A fastener element 134 can then engage through the coupling sleeve 130 and the tubular structure 132 for fixedly securing the coupling sleeve 130 with the tubular structure 132. The coupling sleeve 130 can include a proximal or first end portion provided with connection ears 135, and an opposite distal or second end portion forming a joint bracket 136. An end portion of the rear leg frame 114 can be pivotally connected with the coupling sleeve 130 at the connection ears 135 (as better shown in FIGS. 1 and 2), whereas the handle 116 (as better shown in FIG. 1) and an end portion of the front leg frame 112 can be respectively connected with the coupling sleeve 130 at the joint bracket 136. As shown, the joint bracket 136 can have a cylindrical shape including opposite first and second side surface 136A and 136B of generally planar shapes, and an opening 136C cut through a curved end surface 136D connected between the first and second side surfaces 136A and 136B.

Referring to FIG. 4, each side segment 116B of the handle 116 is pivotally connected on the first side surface 136A of the joint bracket 136 on one coupling sleeve 130. In addition, each of the side segments 116B can also be locked in position with the linkage frame 106 via the first latch mechanism 108. According to one embodiment, an end portion of each side segment 116B can include a cup-like first coupling portion 140. An interior of the first coupling portion 140 can include a protruding axle 142 that defines a pivot axis X1 about which the handle 116 rotates relative to the linkage frame 106.

The first latch mechanism 108 can comprise a lock module 143, a rotary plate 144 for driving the lock module 143, and a position indexing slot (not shown) cut through the first side surface 136A. The lock module 143 is assembled in the first coupling portion 140, and has two movable latch pins 145. Being biased by an inner spring (not shown), the latch pins 145 can engage with the position indexing slot provided on the first side surface 136A for locking the handle 116 with the linkage frame 106.

Referring again to FIG. 4, the rotary plate 144 can be connected with the release actuator 126 via a transmission element 170, such as a cable (not shown), and can rotate about the axle 142. When the release actuator 126 is operated, the rotary plate 144 can be driven in rotation about the axle 142 so as to cause the latch pins 145 to disengage from the position index slots of the first side surface 136A. As a result, the handle 116 can be allowed to rotate about the pivot axis X1 relative to the linkage frame 106.

A distal end portion of the front leg frame 112 can have a second coupling portion 150 with a shape that matches with the generally circular shape of the joint bracket 136. One side of the second coupling portion 150 can include an elongated guide slot 154 that may be connected to a notch 152 formed on a peripheral edge of the second coupling portion 150. A shutter 156 may also be assembled for movable displacement along the guide slot 154 to selectively occlude the notch 152. The second coupling portion 150 can be inserted through the opening 136C of the joint bracket 136, and be pivotally connected with the coupling sleeve 130 about a pivot axis X2. While the pivot axes X2 and X1 are shown as being substantially aligned with each other, it will be appreciated that the pivot axes X2 and X1 may also be misaligned relative to each other. As the second coupling portion 150 is connected with the coupling sleeve 130, a protrusion 156A on one side of the shutter 156 can be lodged into an arc guide slot 158 cut on the second side surface 136B of the joint bracket 136. For preventing external interference with the movement of the protrusion 156A along the guide slot 158, a cover 159 can also be placed to cover the region of the second side surface 136B and guide slot 158.

When the linkage frame 106 rotates about the pivot axis X2 relative to the front leg frame 112 in a direction for collapsing the infant carrier apparatus 100, the joint bracket 136 can drive the shutter 156 to move toward the notch 152 through interaction between the protrusion 156A and the guide slot 158. The shutter 156 can thereby occlude the notch 152 for preventing finger pinching or external jamming.

In contrast, when the linkage frame 106 rotates about the pivot axis X2 relative to the front leg frame 112 in a direction for unfolding the infant carrier apparatus 100, the joint bracket 136 can drive the shutter 156 to move away from the notch 152 through interaction between the protrusion 156A and the guide slot 158. The notch 152 can be thereby exposed for permitting locking of the second latch mechanism 110.

As shown in FIG. 4, the tubular structure 132 can be fixedly secured with the linkage frame 106 by engaging through the hole 133 of the coupling sleeve 130. In one embodiment, the hole 133 can communicate with the opening 136C, and the second latch mechanism 110 for selectively locking the linkage frame 106 with the front leg frame 112 can be disposed in the tubular structure 132. More specifically, the second latch mechanism 110 can include a latching element 160 and a spring 162. The latching element 160 can have an elongated slot 164 formed therein, and an engaging end 166. When the latching element 160 is arranged in the tubular structure 132, the fastener element 134 can movably engage through the elongated slot 164, and two opposite ends of the spring 162 can be respectively anchored with the fastener element 134 and the latching element 160. Moreover, the latching element 160 is connected with the release actuator 120 via the transmission element 170, a first end 170A of the transmission element 170 being anchored with the latching element 160, a second end 170B of the transmission element 170 being connected with the release actuator 120 (as better shown in FIG. 10). Accordingly, a user can operate the release actuator 120 for unlocking the second latch mechanisms 110.

Figure 5:
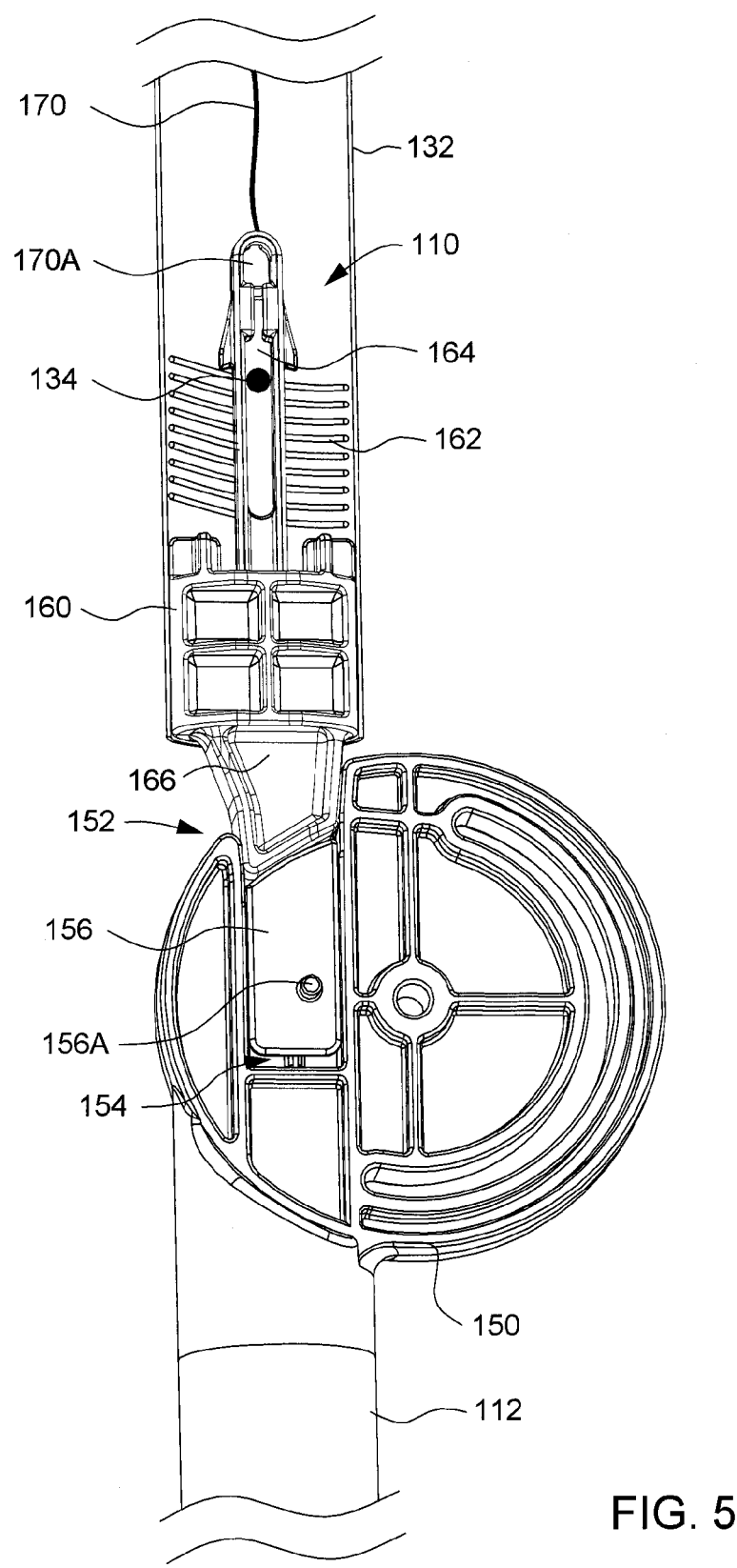
FIG. 5 is a schematic view illustrating the assembly of the second latch mechanism in a tubular structure of the linkage frame.
Figure 6:
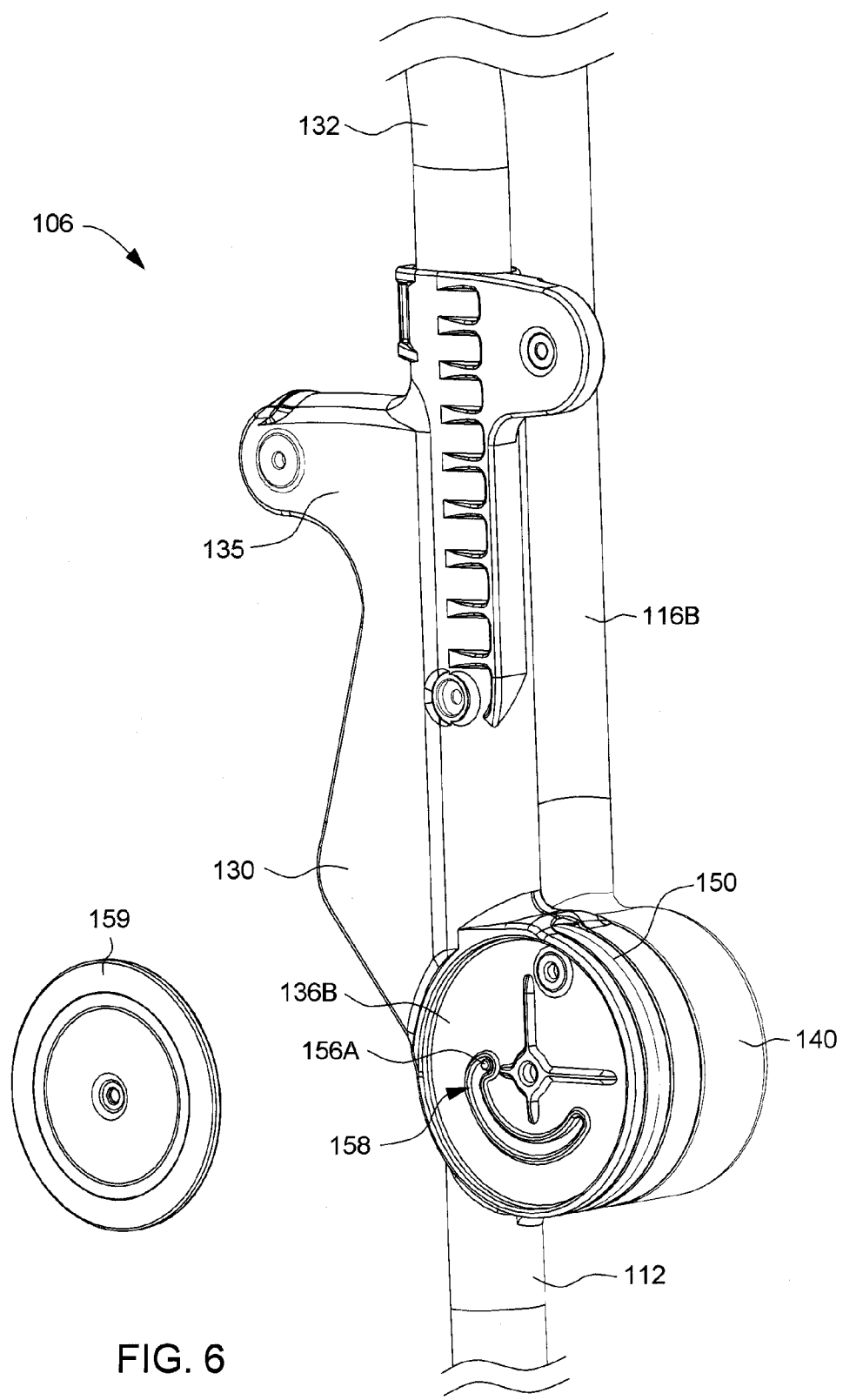
FIG. 6 is a schematic view illustrating the linkage frame, the front leg frame and the handle in the deployed state.

FIG. 5 is a schematic view illustrating one embodiment of one second latch mechanism 110 assembled in a side segment of the tubular structure 132. For clarity, the representation of the coupling sleeve 130 has been omitted in FIG. 5 to more clearly show the interaction between the second latch mechanism 110 and the front leg frame 112. Further, FIG. 6 is a schematic view showing the linkage frame 106, the front leg frame 112 and the handle 116 in a deployed or unfolded state. Referring to FIGS. 5 and 6, the second latch mechanism 110 has a locked state and an unlocked state. When the linkage frame 106 is in the deployed state and the second latch mechanism 110 is in the locked condition, the shutter 156 is in a position that exposes the notch 152. Accordingly, the engaging end 166 of the latching element 160 can extend outside the tubular structure 132 and engage with the notch 152 of the second coupling portion 150, thereby locking the linkage frame 106 with the front leg frame 112.

Figure 7:
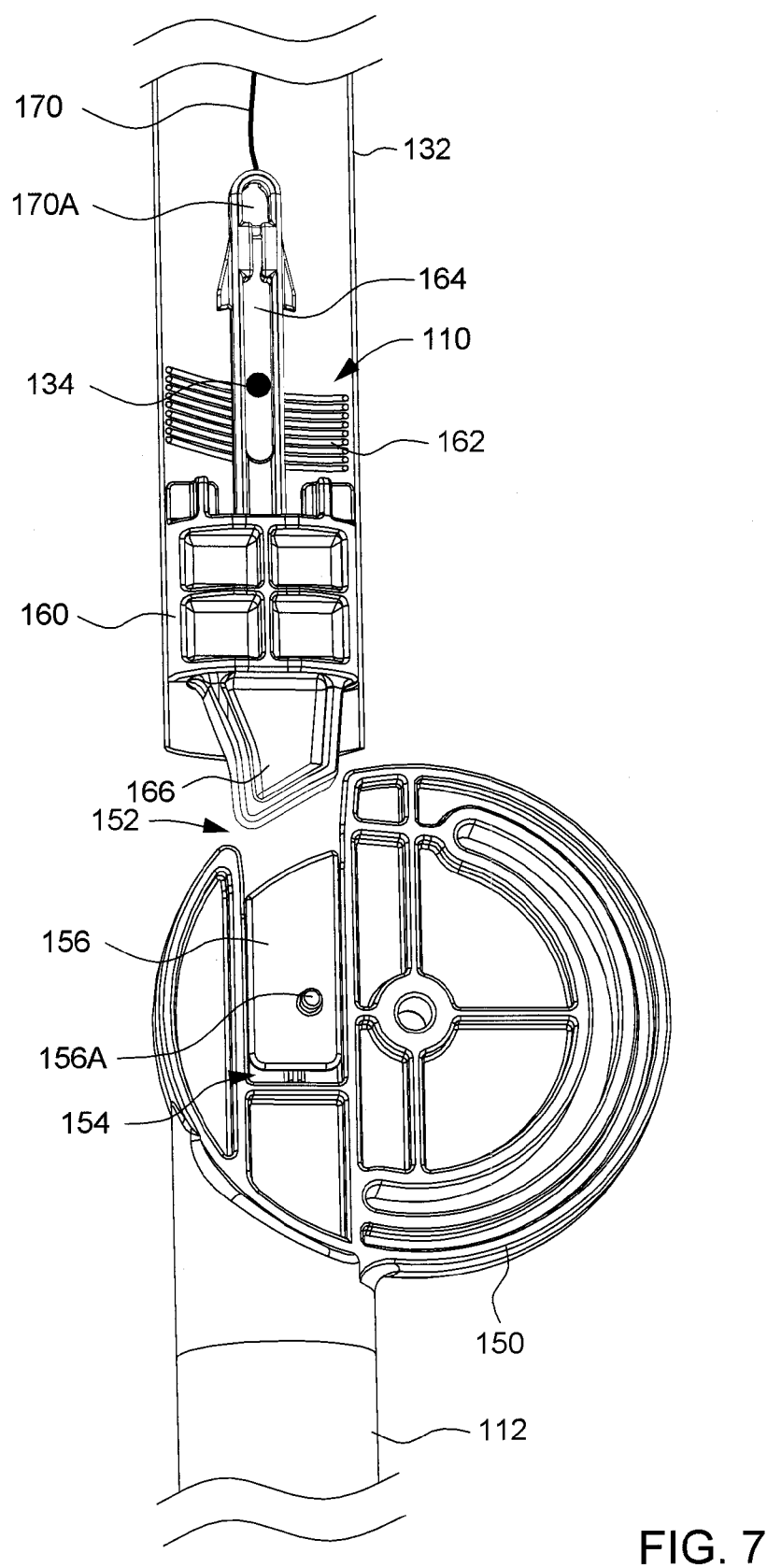
FIG. 7 is a schematic view illustrating the second latch mechanism in an unlocked state.

When the linkage frame 106 is to be rotated relative to the front leg frame 112 in a direction for collapsing or folding the infant carrier apparatus 100, the second latch mechanism 110 first has to be unlocked by operating the release actuator 120. As the release actuator 120 is operated, the transmission element 170 can drive the latching element 160 in translational movement toward the interior of the tubular structure 132 and disengage from the notch 152, thereby turning the second latch mechanism 110 into the unlocked state as shown in FIG. 7. Subsequently, the linkage frame 106 can be rotated about the pivot axis X2 relative to the front leg frame 112. This rotation of the linkage frame 106 can drive the handle 106 in rotation, such that the linkage frame 106 and the handle 116 can be collapsed in a concurrent manner. Moreover, the rotation of the linkage frame 106 also drives a movement of the rear leg frame 114, which collapses toward the longitudinal link bars 117.

Figure 8:
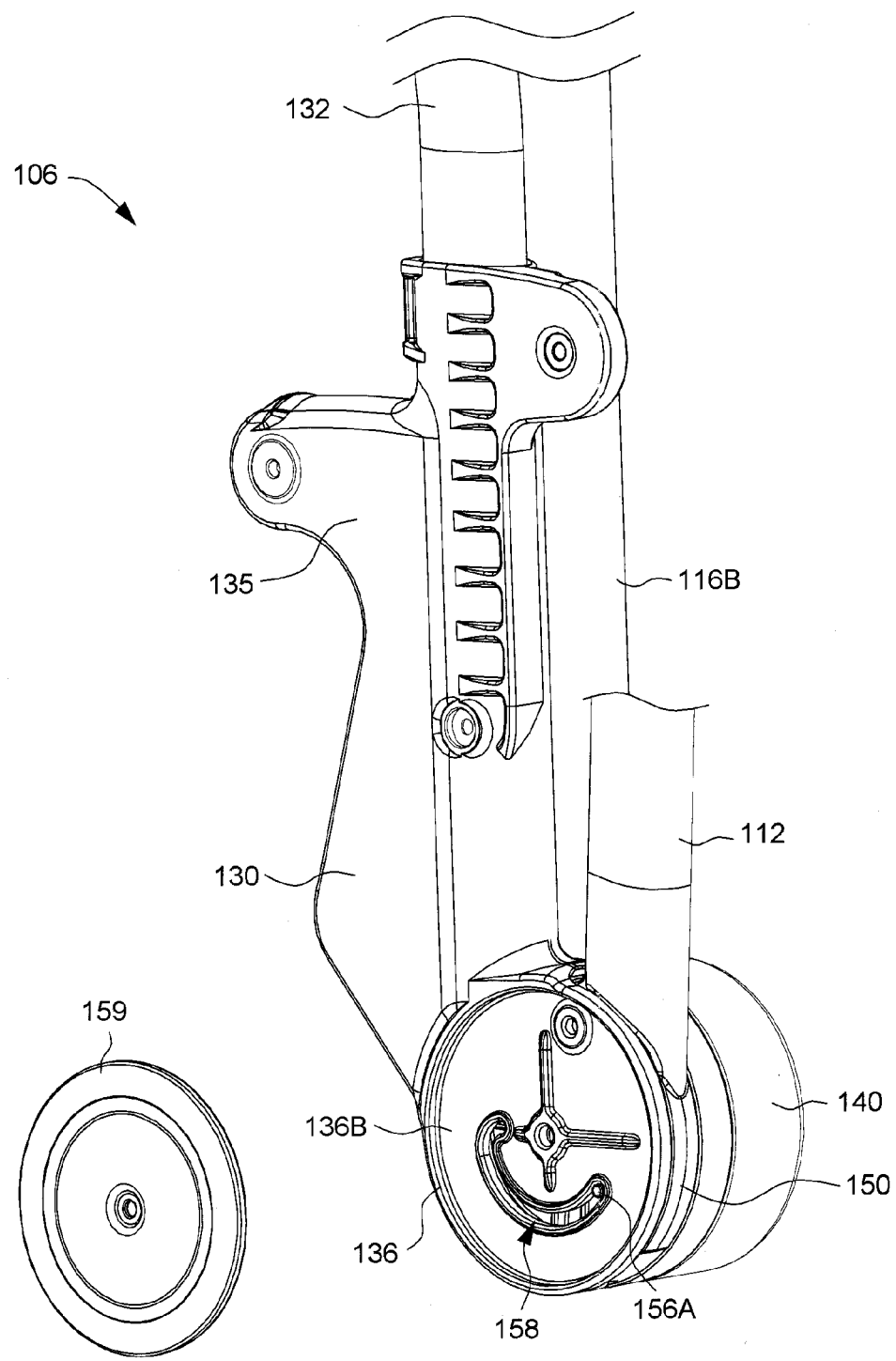
FIG. 8 is a schematic view illustrating the linkage frame and the handle collapsed adjacent to the front leg frame.
Figure 9:
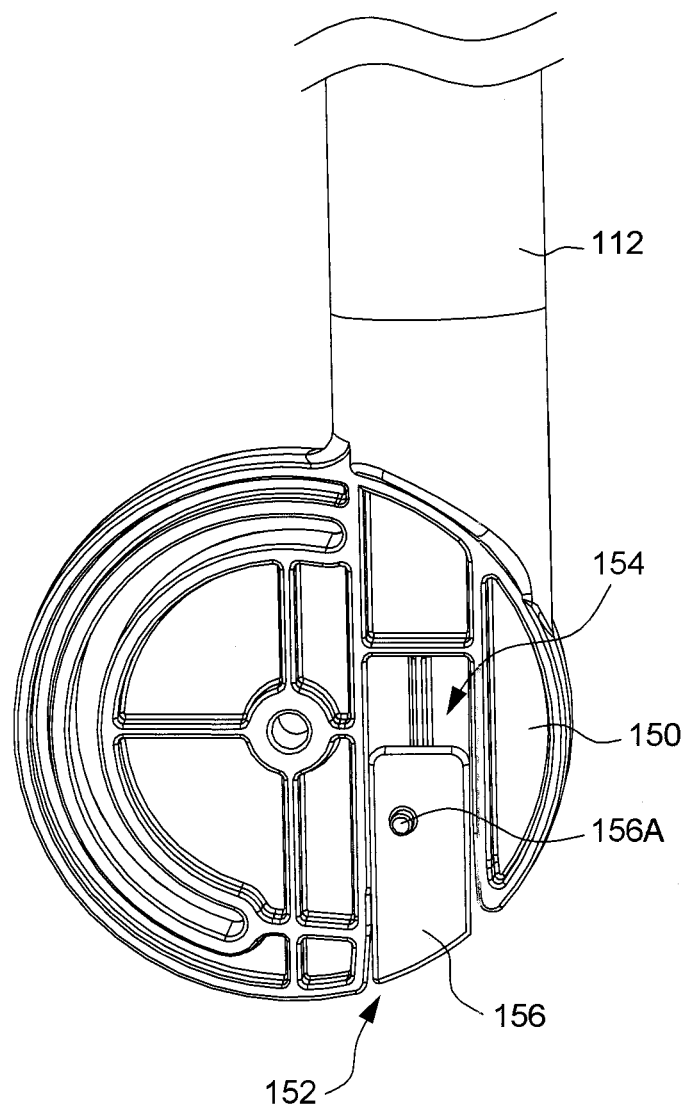
FIG. 9 is a schematic view illustrating the use of a shutter for occluding a notch on the front leg frame when the linkage frame and the handle are in the collapsed state.

While the linkage frame 106 and the handle 116 are being collapsed, the shutter 156 can move along the guide slot 154 to occlude the notch 152. FIG. 8 is a schematic view showing the linkage frame 106 and the handle 116 after they are collapsed to a position adjacent to the front leg frame 112. FIG. 9 is a schematic view illustrating the shutter 156 occluding the notch 152 when the linkage frame 106 and the handle 116 are in the collapsed state.

For unfolding the linkage frame 106, the linkage frame 106 can be reversely rotated about the pivot axis X2 relative to the front leg frame 112. Accordingly, the shutter 156 can move away from the notch 152, such that the notch 152 becomes exposed. When the latching element 160 is in alignment with the position of the notch 152, the spring 162 can urge the latching element 160 to engage with the notch 152 for locking the linkage frame 106 with the front leg frame 112. The infant carrier apparatus 100 can be thereby securely locked the deployed state.

Figure 10:
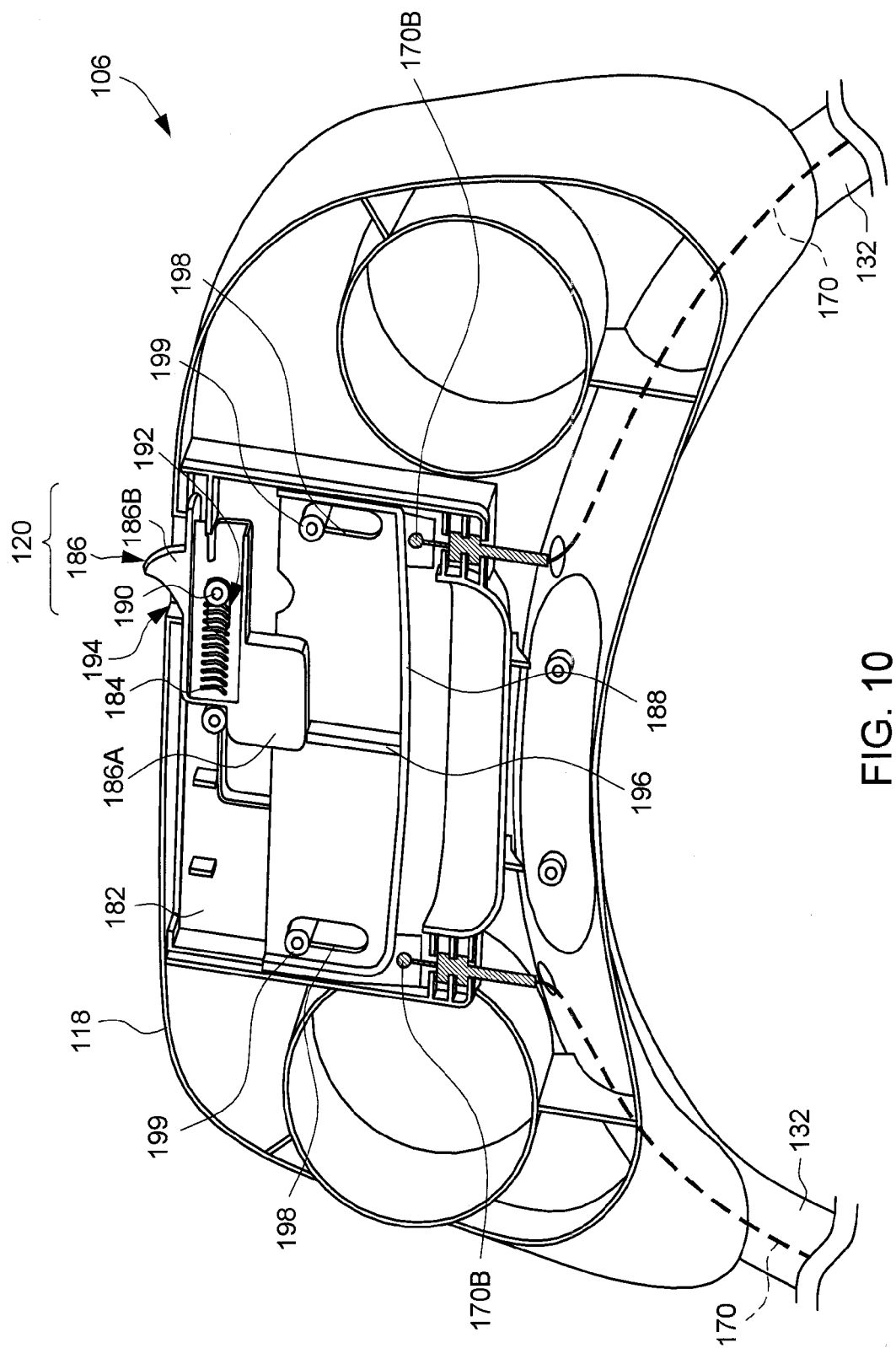
FIG. 10 is a schematic view illustrating a release actuator provided on the linkage frame.
Figure 11:
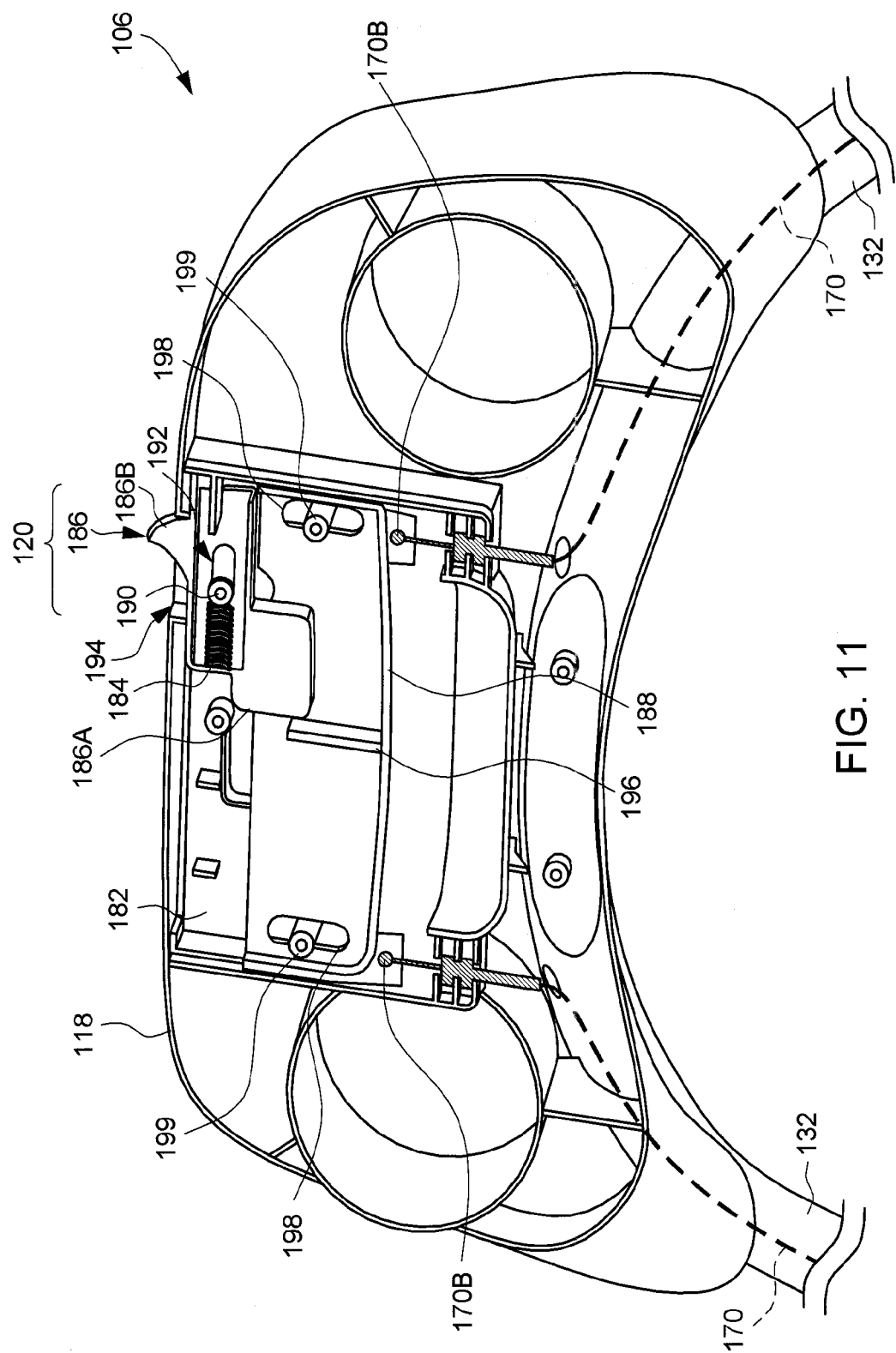
FIG. 11 is a schematic view illustrating the operation of the release actuator.

FIGS. 10 and 11 are schematic views illustrating the operation of the release actuator 120. As shown in FIG. 10, the release actuator 120 can include a housing 182 assembled with the support tray 118, a spring 184, a safety lock 186, and a release handle 188. The second end 170B of the transmission element 170 is connected with the release handle 188. Two ends of the spring 184 are respectively connected with the safety lock 186 and a post 190 provided in the housing 182. In addition, the safety lock 186 can comprise a base 186A having a guide slot 192, and a contact portion 186B. The post 190 can be movably lodged in the guide slot 192, whereas the contact portion 186B extends outward through an opening 194 of the support tray 118. A side of the release handle 188 can include a rib 196 and two sliding slots 198. An inner surface of the housing 182 facing the release handle 188 can include two protruding pins 199 that are movably lodged in the two sliding slots 198, respectively. The safety lock 186 can move relative to the release handle 188 for selectively locking the release handle 188 in position. When the safety lock 186 is in a first position, the base 186A of the safety lock 186 can abut against the rib 196 of the release handle 188, such that displacement of the release handle 188 is substantially blocked. Accordingly, accidental unlocking of the support frame 102 can be prevented.

As shown in FIG. 11, when the safety lock 186 is moved in a lateral direction from the first position to a second position, the post 190 and the safety lock 186 can squeeze the spring 184 while the base 186A moves away from the rib 196. As a result, the release handle 188 can be driven in translational movement, guided by the interaction between the pins 199 and the sliding slots 198.

Referring to FIGS. 1, 2, 10 and 11, the support tray 118 can include an opening 118A through which is placed the release handle 188 for conveniently actuating the second latch mechanism 110. While the support tray 118 is shown as being affixed on the linkage frame 106, other constructions may be suitable. For example, in alternate embodiments, the support tray 118 can be connected with the linkage frame 106 in a detachable manner. In other variant embodiments, both the release actuator 120 and the support tray 118 can also be assembled with the linkage frame 106 in a detachable manner.

At least one advantage of the structures described herein is the ability to use a single hand for modifying the orientation of the handle 116 and collapsing the infant carrier apparatus 100 by rotating the linkage frame 106. Accordingly, the infant carrier apparatus 100 can be operated in a more convenient manner. In addition, because the respective latch mechanisms used for locking/unlocking both the push handle and the support frame can be integrated together, the amount of component parts can be reduced. As a result, the outer appearance of the infant carrier apparatus 100 can look simpler and aesthetically more appealing.

Realizations in accordance with the present invention therefore have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the invention as defined in the claims that follow.

What is claimed is:

1. An infant carrier apparatus comprising:
   a support frame, including a front leg frame, a rear leg frame and a handle, a distal end portion of the handle being affixed with a first coupling portion, and a distal end portion of the front leg frame being affixed with a second coupling portion, the first coupling portion having an inner cavity in which is arranged an axle;
   a seat assembly assembled with the support frame and including a backrest support;
   a linkage frame including a U-shaped tubular structure including at least one side segment, and a coupling sleeve affixed with the side segment, the tubular structure being assembled with a support tray that lies above the backrest support when the infant carrier apparatus is in a deployed state, the coupling sleeve being formed with a joint portion having an opening in which the second coupling portion is received, the axle being pivotally assembled with the joint portion, the coupling sleeve being respectively connected pivotally with the front leg frame, the rear leg frame and the handle, the front leg frame and the handle being respectively connected pivotally with the coupling sleeve about a common pivot axis that is substantially adjacent to the respective distal end portions of the front leg frame and the handle, the pivot axis passing through the joint portion and the first and second coupling portions, whereby the first and second coupling portions are respectively rotatable about the pivot axis relative to the joint portion;
   a first latch mechanism assembled with the handle and the side segment of the linkage frame, wherein the first latch mechanism is operable to lock the handle in position relative to the linkage frame; and
   a second latch mechanism assembled with the side segment of the linkage frame and the side portion of the front leg frame and having a locked state and an unlocked state, the second latch mechanism when in the locked state locks the linkage frame with the front leg frame, and the second latch mechanism when in the unlocked state allowing rotation of the linkage frame relative to the front leg frame.

2. The infant carrier apparatus according to claim 1, wherein the second latch mechanism includes a latching element that is assembled through an interior of the side segment of the linkage frame, the latching element being operable to engage and disengage the second coupling portion of the front leg frame.

3. The infant carrier apparatus according to claim 2, wherein the second latch mechanism further comprises a spring operable to urge the latching element to engage the second coupling portion of the front leg frame.

4. The infant carrier apparatus according to claim 2, wherein the second coupling portion of the front leg frame comprises a notch into which the latching element engages for locking the linkage frame with the front leg frame, and the second coupling portion is assembled with a movable shutter operable to selectively occlude the notch when the linkage frame rotates relative to the front leg frame toward a collapsed position.

5. The infant carrier apparatus according to claim 2, wherein the linkage frame further includes a release actuator that is operable to drive unlocking of the second latch mechanism via a transmission element, the release actuator including a release handle assembled with the support tray, and the transmission element having a first and a second end respectively connected with the release handle and the latching element.

6. The infant carrier apparatus according to claim 1, wherein the rear leg frame is pivotally connected with an end portion of the coupling sleeve that is distal from the joint portion.

7. A collapsible infant carrier apparatus comprising:
   a support frame, including a front leg frame, a rear leg frame and a handle, the handle having a handle side segment affixed with a first coupling portion, and a distal end portion of the front leg frame having a second coupling portion, the first coupling portion having an inner cavity in which is arranged an axle, the second coupling portion including a notch and being assembled with a movable shutter;
   a seat assembly assembled with the support frame and including a backrest support;
   a linkage frame including a tubular structure, and a coupling sleeve that is affixed with the tubular structure and is pivotally connected with the distal end portion of the front leg frame, the coupling sleeve including a joint portion having an opening, the axle being pivotally assembled with the joint portion, the second coupling portion being received in the opening of the joint portion, the tubular structure including a side segment and a transverse segment connected with each other, the side segment being affixed with the coupling sleeve, and the transverse segment extending above the backrest support;
   a first latch mechanism assembled with the handle and the side segment of the linkage frame, wherein the first latch mechanism is operable to lock the handle in position relative to the linkage frame; and a second latch mechanism assembled with the side segment of the linkage frame and the side portion of the front leg frame and having a locked state and an unlocked state, the second latch mechanism including a latching element that is assembled through an interior of the side segment of the linkage frame, the latch engaging or disengaging the notch for locking or unlocking the linkage frame with respect to the front leg frame, the movable shutter being operable to occlude the notch when the latching element is disengaged from the notch, the second latch mechanism when in the locked state locks the linkage frame with the front leg frame, and the second latch mechanism when in the unlocked state allowing rotation of the linkage frame relative to the front leg frame.

8. The infant carrier apparatus according to claim 7, wherein the linkage frame includes a support tray affixed with the transverse segment, and a release actuator that is operable to drive unlocking of the second latch mechanism via a transmission element, the release actuator including a release handle assembled with the support tray, and the transmission element having a first and a second end respectively connected with the release handle and the latching element.

9. The infant carrier apparatus according to claim 8, wherein the release actuator further comprises a safety lock assembled with the support tray, the safety lock being operable to selectively block a displacement of the release handle in a direction for driving unlocking of the second latch mechanism.

10. The infant carrier apparatus according to claim 7, wherein the linkage frame includes a support tray that is assembled with the transverse segment.

11. The infant carrier apparatus according to claim 7, wherein the side segment of the linkage frame and a side portion of the front leg frame extend substantially on a same axis when the infant carrier apparatus is in a deployed state.

12. The infant carrier apparatus according to claim 7, wherein the side segment of the linkage frame is pivotally connected with the handle and the distal end portion of the front leg frame about a common pivot axis.

13. The infant carrier apparatus according to claim 7, wherein the first latch mechanism is arranged adjacent to the axle.

14. The infant carrier apparatus according to claim 7, wherein the second latch mechanism further comprises a spring operable to urge the latching element to engage the second coupling portion of the front leg frame.

15. The infant carrier apparatus according to claim 7, wherein a side of the shutter has a protrusion that is lodged in into a guide slot provided in the joint portion, rotation of the linkage frame relative to the front leg frame toward a collapsed position driving the shutter to move toward a position occluding the notch, and rotation of the linkage frame relative to the front leg frame toward a deployed position driving the shutter to move toward another position exposing the notch to allow engagement of the latching element.

16. The infant carrier apparatus according to claim 7, wherein the rear leg frame is pivotally connected with an end portion of the coupling sleeve that is distal from the joint portion.

\* \* \* \* \*